United States Patent
Mason

(10) Patent No.: US 7,519,588 B2
(45) Date of Patent: Apr. 14, 2009

(54) KEYWORD CHARACTERIZATION AND APPLICATION

(75) Inventor: Zachary Mason, Palo Alto, CA (US)

(73) Assignee: Efficient Frontier, Palo Alto, CA (US)

( * ) Notice: Subject to any disclaimer, the term of this patent is extended or adjusted under 35 U.S.C. 154(b) by 303 days.

(21) Appl. No.: 11/452,709

(22) Filed: Jun. 13, 2006

(65) Prior Publication Data

US 2006/0287988 A1 Dec. 21, 2006

Related U.S. Application Data

(60) Provisional application No. 60/755,333, filed on Dec. 29, 2005, provisional application No. 60/692,421, filed on Jun. 20, 2005.

(51) Int. Cl.
*G06F 17/30* (2006.01)
(52) U.S. Cl. .................. 707/5; 707/2; 707/3; 707/4
(58) Field of Classification Search ................ 707/2–6; 706/45
See application file for complete search history.

(56) References Cited

U.S. PATENT DOCUMENTS

| | | | |
|---|---|---|---|
| 6,470,307 B1 * | 10/2002 | Turney | 704/9 |
| 6,778,979 B2 * | 8/2004 | Grefenstette et al. | 707/3 |
| 7,124,129 B2 * | 10/2006 | Bowman et al. | 707/5 |
| 7,321,892 B2 * | 1/2008 | Vadon et al. | 707/4 |
| 2003/0220866 A1 | 11/2003 | Pisaris-Henderson et al. | |
| 2004/0225562 A1 | 11/2004 | Turner | |
| 2005/0144068 A1 | 6/2005 | Calabria et al. | |
| 2005/0216516 A1 | 9/2005 | Calistri-Yeh et al. | |

FOREIGN PATENT DOCUMENTS

WO WO013041 A1 1/2001

* cited by examiner

*Primary Examiner*—Yicun Wu
(74) *Attorney, Agent, or Firm*—Schwabe Williamson & Wyatt P.C.

(57) ABSTRACT

Methods, apparatuses, and articles for receiving a collection of documents and/or objects determined to be potentially relevant to a keyword, and processing the collection of documents and/or objects to extract one or more keyword characterizations for use as proxies for the keyword, are described herein. In various embodiments, the one or more keyword characterizations may be used to compute a measure of keyword similarity for the keyword, facilitate keyword behavior modeling of the keyword, and/or find one or more advertisements.

31 Claims, 4 Drawing Sheets

KEYWORD CHARACTERIZATION AND APPLICATION

RELATED APPLICATIONS

The present application claims priority to U.S. Provisional Application 60/692,421, entitled "Keyword Characterization and Application", filed on Jun. 20, 2005, and to U.S. Provisional Application 60/755,333, entitled "Keyword Semantics", filed on Dec. 29, 2005. The specifications of the 60/692, 421, and 60/755,333, provisional applications are hereby fully incorporated by reference.

FIELD OF THE INVENTION

The present invention relates to the field of data processing, in particular, to methods and apparatuses for keyword characterization, having particular application to advertising associated with information search using a search engine.

BACKGROUND OF THE INVENTION

Search engines exist to make information accessible. Among the kinds of information promulgated by search engines is advertising. The display of advertisements ("ads") is often mediated by a bidding system—an advertiser bids on a keyword and the placement of his ad on the search result page for that keyword depends on, possibly among other factors, his bid. Often, the click-through rate on the ad is a function of its placement.

It is in an advertiser's interest to know about as many relevant keywords as possible. Manually generating keywords for a domain is a difficult, labor intensive task—for a given topic there can be many keywords. Additionally, the linguistic behavior associated with search is not entirely like any other, and thus may be difficult to intuit.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

Illustrative embodiments of the present invention include, but are not limited to, methods and apparatuses for receiving a collection of documents and/or objects determined to be potentially relevant to a keyword, and processing the collection of documents and/or objects to extract one or more keyword characterizations for use as proxies for the keyword. In various embodiments, the one or more keyword characterizations may be used to compute a measure of keyword similarity for the keyword, facilitate keyword behavior modeling of the keyword, and/or find one or more advertisements.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

As used throughout the application, the term "keyword" may refer to any word, string, token, phrase, or set of words (which may or may not be ordered), strings, tokens, or linguistic constructs that may be searched upon by a user. "Keyword" may also refer to non-linguistic constructs, such as a partial image that may be used in an image search.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
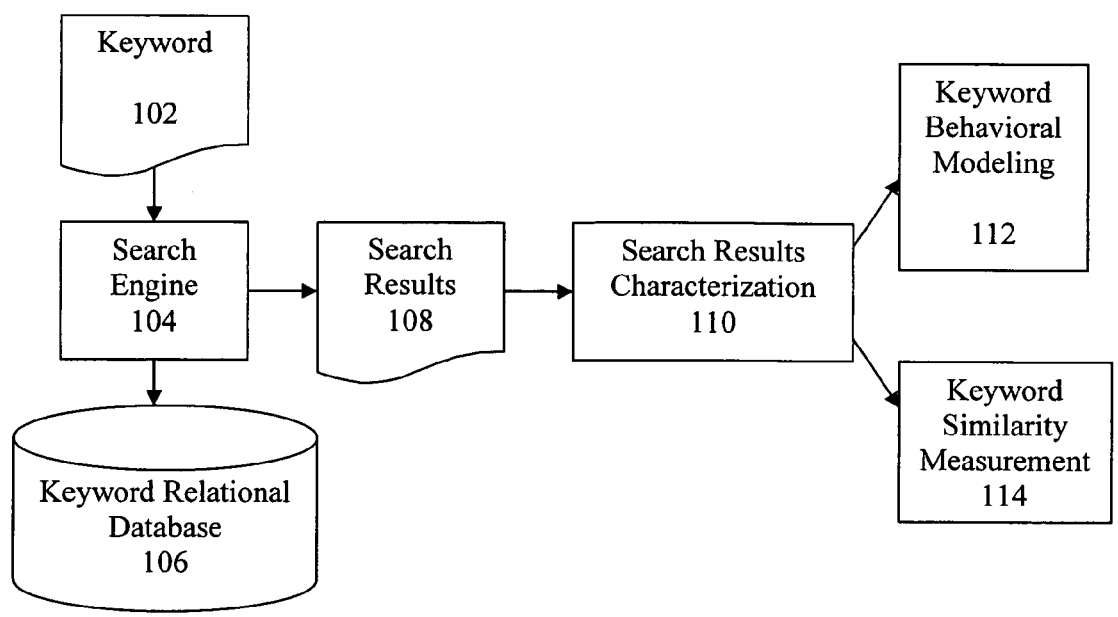
FIG. 1 illustrates an overview of various embodiments of the present invention, processing documents and/or objects determined to be potentially relevant to a keyword to extract keyword characterizations for use as proxies for the keyword.

FIG. 1 illustrates an overview of various embodiments of the present invention, processing documents and/or objects determined to be potentially relevant to a keyword to extract keyword characterizations for use as proxies for the keyword. As illustrated, search results 108, comprising a collection of documents and/or objects determined to be potentially relevant to a keyword 102, may be received and utilized by a search results characterization process 110. As will be described in more detail below, the search results 108 may be received from a search engine 104, which may take a keyword 102 as input and search a keyword relational database 106 or some other electronic information corpus (based on the keyword 102), obtaining a collection of documents and/or objects as search results 108. The search results characterization process 110 may process the search results 108 to extract keyword characterizations for use as proxies for the keyword 102, and the keyword characterizations, in some embodiments, may then serve as inputs to one or more other processes, such as keyword behavior modeling process 112 or keyword similarity measurement process 114.

In various embodiments, search engine 104, search results characterization process 110, keyword behavior modeling process 112, and keyword similarity measurement process 114 may be separate processes of a computer system. In other embodiments, they may be sub-processes of one or more processes of the computer system. In yet other embodiments, processes 104, 110, 112, and 114 may be modules of the computer system. For ease of understanding, however, the processes 104, 110, 112, and 114 will be described as separate processes of a computer system throughout the following description of FIG. 1, but shall not be read as limiting on the scope of the invention.

In some embodiments, the various processes and data illustrated by FIG. 1 may be processes and data of a computer system (not shown), such as the exemplary computer system illustrated by FIG. 4, which is described in greater detail below. The computer system, except for keyword 102, search engine 104, database 106, search results 108, search results characterization process 110, keyword behavioral modeling process 112, keyword similarity measurement process 114, and other processes utilizing the extracted keyword characterizations (discussed below), may be any single- or multi-processor computing system known in the art, such as a personal computer (PC), a workstation, a server, a router, a mainframe, a personal digital assistant (PDA), an entertainment center, a set-top box, or a mobile device. In some embodiments, the computer system may additionally comprise one or more networking interfaces (not shown) connecting the computer system to a networking fabric (not shown), facilitating a web browser of the computer system in interacting with a search engine 104 to search an electronic information corpus, such as the World Wide Web. The networking interfaces may be of any sort known in the art, such as Ethernet, Bluetooth, WiFi (802.11), or 3 G interfaces, providing connectivity to a wired or wireless networking fabric. In one embodiment, the processes and data illustrated by FIG. 1 are, instead, a series of distributed processes of a plurality of computer systems connected by a networking fabric. In yet another embodiment, the keyword relational database 106 is located on a database server and the search engine 104 on a web application server, both servers separate from the computer system or systems having the other data and processes illustrated by FIG. 1. For ease of understanding, however, reference to one computer system possessing each of the data and processes depicted in FIG. 1 will be made throughout the following description.

In various embodiments, the computer system described above may be connected to a networking fabric (not shown) which, in some embodiments, may provide access to the World Wide Web and/or some other electronic information corpus, including access to a search engine 104, which may be a web application provided by a remote web application server. The networking fabric may a local area network, a wide area network, or the Internet. Further the connections between the various computer systems of the networking fabric may be of any sort known in the art, such as transmission control protocol/Internet protocol (TCP/IP) connections or asynchronous transfer mode (ATM) virtual connections.

As is shown, the computer system of FIG. 1 may receive or generate a keyword 102. In some embodiments, a plurality of keywords may, instead, be received or generated. For ease of understanding, however, the following description will refer to one keyword 102. The keyword 102 may be any word, string, token, phrase, or set of words (which may or may not be ordered), strings, tokens, or linguistic constructs that may be searched upon by a user. The keyword 102 may also refer to non-linguistic constructs, such as a partial image that may be used in an image search. In some embodiments, keyword 102 may be a word, a set of words, or phrase that is used by a consumer to search for a specific product or service, and is thus of interest to merchants of that product or service. In various embodiments, the keywords may be generated by a keyword generator generating keywords at random or, based upon a set of criteria provided by a merchant or some other user, or generated by a keyword generation method, such as the method disclosed in "Keyword Generation Method and Apparatus," a co-pending patent application Ser. No. 11/371,267, filed on Mar. 8, 2006. In other embodiments, the keyword 102 may actually be a keyword characterization extracted by search results characterization process 110 that may then be searched upon by search engine 104 as a keyword 102 in its own right. In yet other embodiments, keyword 102 may be received by the computer system rather than generated. The keyword 102 may be received via an input device, a networking fabric or through a storage medium, and may have been previously generated by any of the above methods.

In various embodiments, the keyword 102 may be input to a search engine 104, which may search the database 106, an electronic information corpus, or the World Wide Web based on the keyword 102. In some embodiments, search engine 104 may be a Google or Yahoo! web search engine. The search engine 104 may be accessed via a web browser (not shown) of the computer system, such as the Internet Explorer web browser produced by Microsoft of Redmond, Wash., or the Firefox web browser of Mozilla Foundation of Mountain View, Calif. In other embodiments, the search engine 104 may be a process of the computer system rather than a web application accessible via a web browser. In some embodiments, the computer system may possess a plurality of search engines 104, including a first accessible via a web browser (e.g., Google) and a second executing on the computer system as a search engine 104 process. The first search engine 104 may be used to search the World Wide Web and/or an electronic corpus of web pages and data objects, and the second search engine 104 may be used to search the keyword relational database 106. In other embodiments, either search engine 104 may search one or all of database 106, the World Wide Web, and an electronic corpus. If a process of the computer system, the search engine 104 may possess a user interface, such as a graphic user interface, to facilitate a user in conducting the search. In some embodiments, however, no user need be involved in the search and the search engine 104 process may perform its functions automatically, at the request of another process.

In addition to the active searches mentioned above, keyword 102 may also be input to search engine 104 to perform a passive search. A passive search is a search initiated by a process to inform a user, attempting to answer user queries before they are submitted by predicting the queries and returning the results. For example, a user's cell phone may keep track of its location via GPS technology and may use the location information as keyword 102 to search for and retrieve geographically close destinations that may be of interest to the user, such as a coffee house or restroom.

As illustrated, the computer system of FIG. 1 may comprise a keyword relational database 106, which may be any sort of relational database capable of organizing data into entities and representing the relationships between those entities. In other embodiments, database 106 may be another sort of database, which may or may not store normalized data. In some embodiments, database 106 may store a number of web pages and data objects. The search engine 104 may perform a lookup function in database 106, based on the keyword 102, to produce the search results 108. These search results may be web pages and/or data objects that the search engine 104 determines may be relevant to the keyword 102.

In alternate embodiments, not shown, the search engine 104 may search an electronic information corpus or the World Wide Web and receive a search results page indicating the most relevant web pages and/or data objects. In such embodiments, the search engine 104 or some related process may then retrieve and collect the web pages and/or data objects, forming the search results 108. In other embodiments, the search engine 104 may receive the web pages and/or data objects themselves rather than a results page with links, as described above. The web pages and/or data objects may be retrieved from one or more remote computer systems connected to the computer system via a networking fabric.

In various embodiments, the search results 108 may comprise a collection of documents and/or objects determined to be potentially relevant to the keyword 102. The search results 108 may be web pages in which keyword 102 appears or web pages in which the constituent words of keyword 102 appear. The web pages may be documents of any format known in the art and used to display web pages, including HTML format, HTM format, and PDF format, among many others. The documents of search results 108 need not be web pages however but, rather, may be any sort of document containing the keyword 102 or constituent words of the keyword 102. Such documents may be found in some electronic corpus rather than on the World Wide Web.

Search results 108 may also include data objects, which may be annotated with keywords. Thus, the search engine 104 may find data objects annotated with keyword 102, with keywords identical to words of keyword 102, or with keywords semantically similar to keyword 102 or a word of keyword 102. If keyword 102 is an image, search engine 104 may also find non-textual data objects that have not been annotated with keywords. Exemplary data objects may or may not be annotated with keywords and may be textual, partially textual, and non-textual in nature. Some types of data objects are: images, video files, programs, files of any type, and even items such as companies, descriptions of molecules, etc. The data objects may be made searchable, possibly through a keyword driven interface, such as search engine 104. The data objects may be made searchable on the basis of the text composing them (in the case of documents), the text associated with them (such as annotations on a photograph, commentary, reviews or scripts associated with a movie or tv show) chemical constituents of a molecule, close parentheses, created ambiguity, or some other feature-set derived directly or indirectly from the data objects. In some embodiments, corpora-based methods may produce results such that even searches that do not have any terms in common with the annotation keywords may match them.

In some embodiments, the number of documents and/or objects comprising search results 108 may be limited to a pre-determined threshold number of the most relevant web pages and/or objects produced by the search engine 104.

As illustrated, the search results characterization process 110 may process the collection of documents and/or objects comprising search results 108 to extract one or more keyword characterizations for use as proxies for keyword 102. In various embodiments, the search results characterization process 110 may be incorporated into a keyword search engine, such as, for example, search engine 104. Processing the search results 108, by search results characterization process 110, may comprise at least one of: generating a spectrum of n-grams; extracting and aggregating noun phrases, proper nouns, and/or named entities; determining links to and/or from a document of search results 108; calculating a distance from a document of search results 108 to a set of websites or data resources; determining a distance from keyword 102 to a range of core word senses; and determining a web page of the search results 108.

Figure 3:
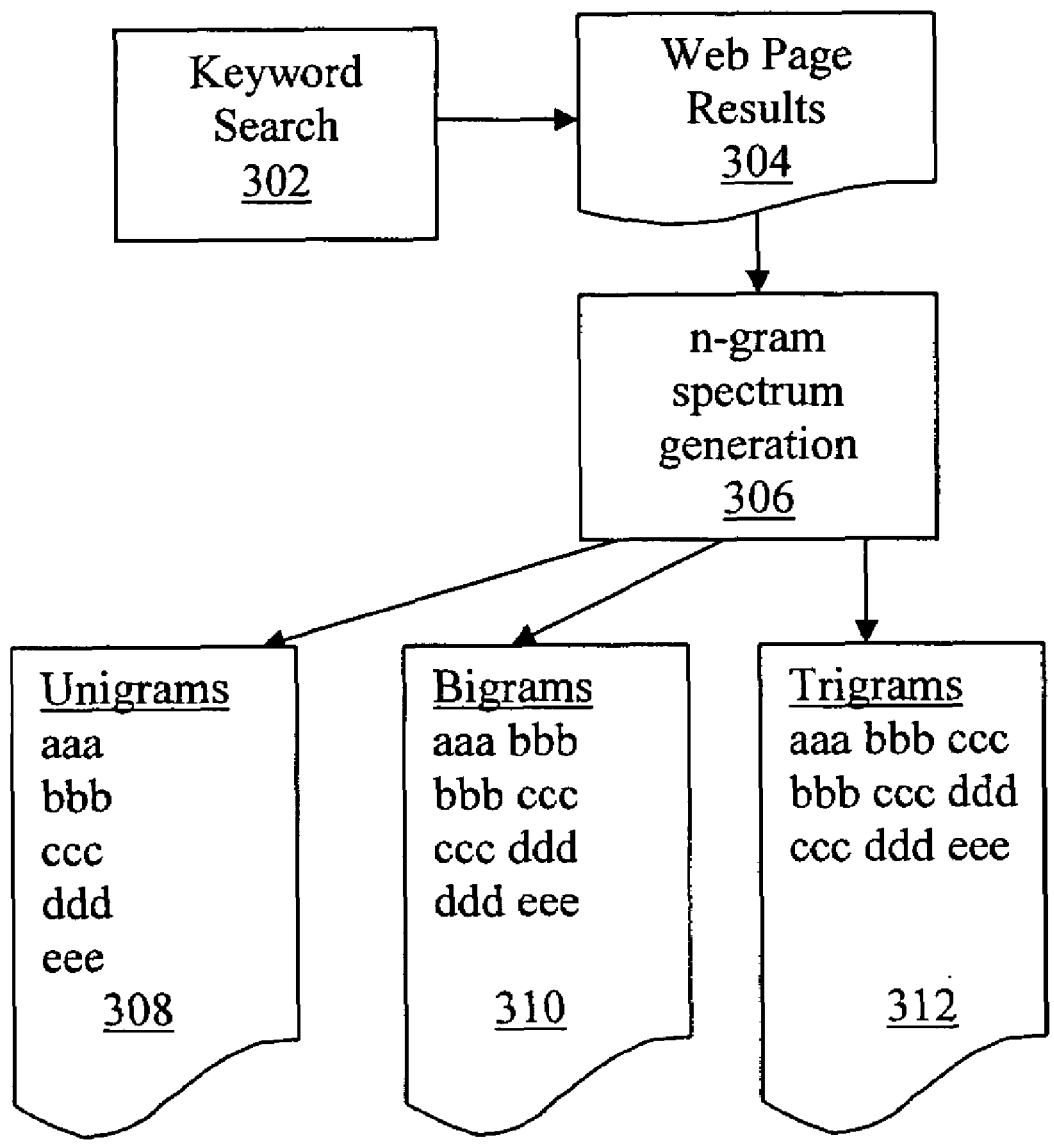
FIG. 3 illustrates a block diagram depicting a method of processing web page results comprising a collection of documents and/or objects to extract one or more keyword characterizations for use as proxies for the keyword, in accordance with various embodiments.

More specifically, processing search results 108 may involve generating a spectrum of n-grams, the spectrum of n-grams constituting keyword characterizations that may be used as proxies for keyword 102. These n-grams may be generated by obtaining search results 108 and extracting from those results one or more sequences of a number (n) of contiguous words found within the documents and/or annotated object descriptions returned by the search. Unigrams may be individual words; bigrams may be pairs of adjacent words, etc. Generally, this type of characterization of keyword 102 may result in a spectrum of n-grams, where n is typically a small positive integer equal to or greater than 1. An exemplary spectrum of n-grams is illustrated by FIG. 3.

In various embodiments, the n-gram generating performed by search results characterization process 110 may further involve calculating the frequencies of one or more of the n-grams, where the frequencies are absolute or relative to some base-line corpus, such as search results 108. The frequencies may constitute additional keyword characterizations.

In some embodiments, processing the search results 108 may also, or instead, involve extracting noun phrases, proper nouns, or named entities from the documents and/or annotated object descriptions and aggregating them in some way. For example, ontologies may be employed to make generalizations over nouns, keywords, or noun phrases associated with keyword 102. Such noun phrases, proper nouns, named entities, and/or aggregations of one or all may also comprise part or all of a keyword characterization.

Further, processing the search results 108 by the search results characterization process 110 may also involve determining links to and/or from a document. Such a document could be a web page of the collection of documents and/or objects. Keyword characterizations extracted by such processing could comprise the links to and/or from a search result page of search results 108, or the links to and/or from a web page of search results 108.

In other embodiments, processing the search results 108 could involve calculating a distance to, or association with, some core set of websites or data resources. Such a distance, which may constitute a feature in a keyword characterization, could be the number of link traversals required to get between the search result page of search results 108 or a document and/or object of search results 108 and a core website or data resource.

In various embodiments, processing the search results 108 may further involve determining a distance metric from a word of keyword 102 to representations of a range of core word senses, the representations in some embodiments extracted from the search results 108. The keyword 102 may be a set of words or a phrase comprised of words that support ambiguous interpretations, or may be a word that, itself, supports ambiguous interpretations, and, thus, a plurality of possible characterizations. For example, "bay area fencing," fencing may support an ambiguous interpretation by potentially referring to the sport of fencing or to the construction material. Thus, determining a distance from a word of keyword 102 to representations of a range of core word senses may facilitate automatically disambiguating the keyword 102, and such a distance metric may constitute at least a part of a keyword characterization for use as a proxy for the keyword 102.

In various embodiments, processing the search results 108 by search results characterization process 110 may also, or instead, involve determining a document or documents, such as a web page returned by the search engine 104 for keyword 102 (rather than, for example, the pages linked to or on that page).

In alternate embodiments, processing search results 108 to extract one or more keyword characterizations may involve a number of other calculations/determinations, such as the per month frequency of searches of keyword 102 on search engine 104.

As is shown, once the search results characterization process 110 of the computer system has extracted one or more keyword characterizations, the one or more characterizations may be used as proxies for the keyword 102. In some embodiments, the keyword characterizations may facilitate keyword behavioral modeling of keyword 102 by the keyword behavioral modeling process 112 of the computer system. Keyword behavioral models may include, but are not limited to, models of keyword 102's click-through rate, and models of revenue-generating properties of search ads linked to keyword 102. In various embodiments, a model may include a neural network or a backward propagation system, and the input keyword characterizations may include one binary or real valued feature for some subset of the n-grams associated with the keyword 102.

In some embodiments, the keyword similarity measurement process 114 of the computer system may also use the keyword characterizations extracted by the search results characterization process 110 for use as proxies for the keyword 102, computing a measure of keyword similarity for the keyword 102. In one embodiment, where the keyword characterizations are n-grams, the n-grams may facilitate the computation of keyword similarity measures by computing the probabilities of each n-gram, taking their dot product, and weighing each n-gram according to their inverse frequency in some broad corpus. In other embodiments, similarity measures may be computed by the keyword similarity measurement process 114 using a Bayesian classifier. In such embodiments, the Naïve Bayes algorithm, as it is generally used for document classification, may be used by treating the keyword 102 as a document, and another keyword or one of the keyword characterizations as a category. A similarity measure (e.g., an asymmetric one) of another embodiment may be computing probabilities as above and then finding their relative entropy.

Keyword similarity measures may be useful for classifying keywords, finding keywords that may be relevant to a merchant, and finding keywords that may be relevant to some other keyword. Techniques of these and similar embodiments may be used for keywords having no, or limited, other data associated with it (other than the extracted keyword characterization(s), that is). For example, a keyword 102 might not be associated with any click-through data. Thus keywords relevant to a given topic may be produced in accordance with a generate-and-test methodology.

In various embodiments, not shown, the keyword characterizations may be used to filter a plurality of other generated keywords by the computer system. In such embodiments, a method of keyword generation may produce a larger number of results than desired, and the keyword characterizations may be used to produce a subset of the generated keywords, such as a subset determined to be more optimal for a given merchant. In other embodiments, the keyword characterizations may be used to filter the results from other methods of keyword generation in other contexts.

Further, in some embodiments, also not shown, the keyword characterizations may be used to find one or more advertisements for keyword 102. For example, a keyword 102, when searched upon in a search engine 104, might not return any advertisements. Thus, keyword characterizations for use as proxies for that keyword 102, such as the distance metric to a related keyword, mentioned above, may be used to find the keyword most similar to keyword 102, such that keyword 102 has an ad associated with it. In some embodiments, the search engine 104 may be adapted to find advertisements for keyword 102 only if the keyword most similar to the keyword 102 reaches some predetermined threshold of keyword similarity.

In various embodiments, the advertisements found may be relevant to a domain name. This may take the form of advertisements one might wish to surface on an otherwise empty website (including, for example, when only the domain name is known). In some embodiments, keyword characterization may be used in advertising contexts other than ads in search engines. For example, based on a transcript of a television show, ads may appear on the margins of the television screen. Some such other advertising contexts may include: print, radio, television, etc. In some embodiments, use in various advertising contexts may include samples of text associated with each data object, including, for example, the script of an ad, reviews or an abstract of a television show, and so forth.

Figure 2:
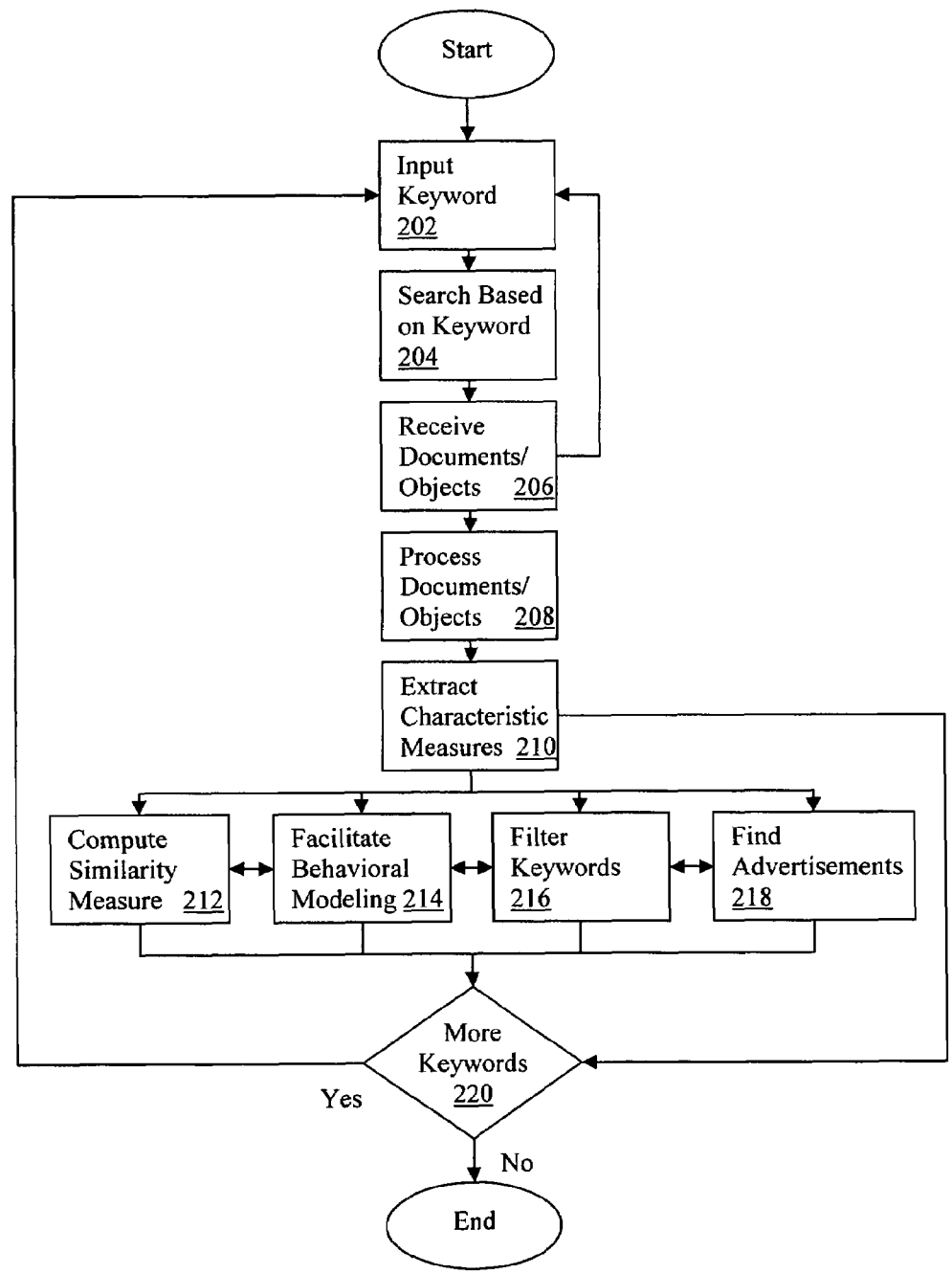
FIG. 2 illustrates a flow chart view of selected operations of the methods of various embodiments of the present invention, to extract keyword characterizations from documents and/or objects determined to be relevant to the keyword.

FIG. 2 illustrates a flow chart view of selected operations of the methods of various embodiments of the present invention, to extract keyword characterizations from documents and/or objects determined to be potentially relevant to the keyword. As illustrated, a computer system may receive and/or generate a keyword, input the keyword into a search engine which may search based upon the keyword, and receive as search results a collection of documents and/or objects, blocks 202-206. As discussed earlier, in various embodiments, a computer system performing some or all of the operations illustrated by FIG. 2 may generate a keyword itself, or may receive a keyword generated by another computer system. The keyword may be a word, a set of words, or a phrase that is used by a consumer to search for a specific product or service, and is thus of interest to merchants of that product or service. In some embodiments, the keyword may be a keyword characterization previously extracted by the computer systems, block 210. The computer system may then input the keyword into a search engine, block 202, and search based upon the keyword, block 204. The search engine may search a keyword relational database, an electronic information corpus, or the World Wide Web. Based upon the search, the search engine may receive a collection of documents and/or objects, block 206, which may comprise web pages, documents from an electronic information corpus, and/or data objects, such as audio and video files, that are determined to be potentially relevant to the keyword.

As illustrated, the computer system may process the collection of documents and/or objects, extracting one or more keyword characterizations for use as proxies for the keyword, blocks 208-210. The processing of the collection of documents and/or objects, block 208, may comprise at least one of: generating a spectrum of n-grams; extracting and aggregating noun phrases, proper nouns, and/or named entities; determining links to and/or from a document of the collection of documents and/or objects; calculating a distance from a document of the collection of documents and/or objects to a set of websites or data resources; determining a distance from the keyword to a range of core word senses; and determining a web page of the collection of documents and/or objects. Accordingly, the keyword characterizations extracted, block 210, by processing the collection of documents or objects may include n-grams, aggregations of noun phrases, proper nouns, or named entities, links, distance metrics, and web pages, all described in greater detail above.

In some embodiments, the computer system may optionally utilize the keyword characterizations in one or more of the following operations: computing a similarity measure, facilitating behavioral modeling, filtering keywords, and finding advertisements, blocks 212-218. Computations of keyword similarity measurement, block 212, may involve, for example, taking a dot product of the spectrum of n-grams (where the keyword characterizations are a spectrum of n-grams), and weighing each n-gram based on an inverse frequency of that n-gram. In other embodiments, computations of keyword similarity measurement, block 212, may involve Bayesian classification methods, discussed in greater detail above. Facilitating keyword behavioral modeling, block 214, may involve inputting the keyword characterizations into models of keyword click-through and revenue generating properties, and/or may include neural networks and/or backward propagation systems. Also, the keyword characterizations may be used to filter a plurality of generated keywords, block 216, where more keywords have been generated than is desirable. Further, the keyword characterizations may be used to find advertisements where the keyword has no advertisements associated with it, block 218. Such advertisements may be advertisements that are relevant to a domain name.

As is shown, upon extracting the keyword characterizations, block 210, or upon completing one or more of operations 212-218, the computer system may determine if more keywords have been received or generated, block 220. If more keywords have been generated or received, blocks 202-220 may be repeated.

FIG. 3 illustrates a block diagram depicting a method of processing web page results comprising a collection of documents and/or objects to extract one or more keyword characterizations for use as proxies for the keyword, in accordance with various embodiments. As illustrated, a keyword search process 302 may generate a number of web page results 304. An n-gram spectrum generation process 306 may then accept the web page results 304 as input and generate pluralities of unigrams 308, bigrams 310, and trigrams 312 for use to characterize the keyword that was input to the keyword search process 302.

More specifically, the keyword search process 302 may receive one or more keywords as input to a search engine which may search a database, electronic corpus, or the World Wide Web to obtain web page results 304. Such a keyword search process 302 is described above in greater detail in reference to keyword 102, search engine 104, and keyword relational database 106 of FIG. 1. Web page results 304 are also discussed in greater detail above in reference to search results 108 of FIG. 1 and, like search results 108, web page results may comprise a collection of documents and or objects.

As is illustrated, the web page results 304 may be input to an n-gram generation process 306. The n-grams may be generated by obtaining the web page results 304 and extracting from those results 304 one or more sequences of a number (n) of contiguous words found within the web pages returned by the search. Unigrams may be individual words; bigrams may be pairs of adjacent words, etc. Generally, this type of characterization of a keyword may result in a spectrum of n-grams, where n is typically a small positive integer. The spectrum in FIG. 3 may be limited, for purposes of explanation only, to n=3. In other embodiments, n may be other values. The words aaa, bbb, ccc, ddd, and eee may be those contained in a hypothetical set of web page results 304 returned by a search engine in response to a particular keyword. The unigrams 308 may be individual listings of those words; the bigrams 310 may be pairs of adjacent words; and the trigrams 312 may be groups of three contiguous words.

In various embodiments, other information in addition to the existence of the n-grams may also be maintained, such as their frequencies, either absolute or relative to some base-line corpus.

Figure 4:
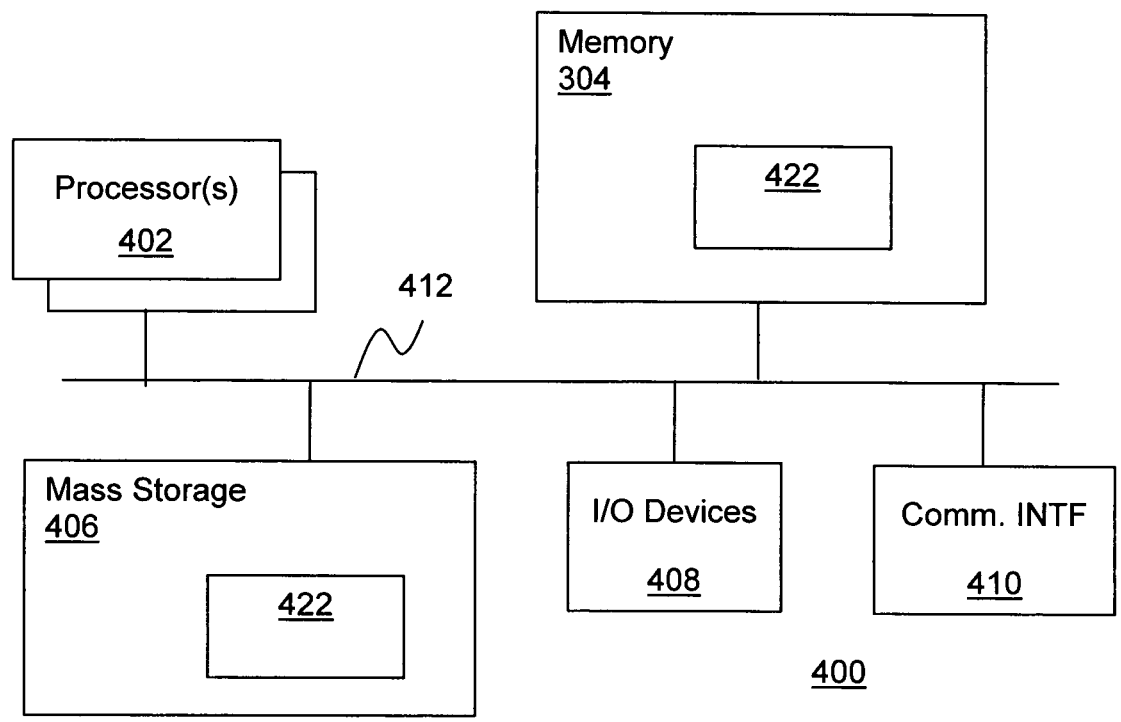
FIG. 4 is a block diagram illustrating an example computing device suitable for use to practice the present invention, in accordance with various embodiments.

FIG. 4 is a block diagram illustrating an example computing device suitable for use to practice the present invention, in accordance with various embodiments. As shown, computing system/device 400 includes one or more processors 402 and system memory 404. Additionally, computing system/device 400 includes mass storage devices 406 (such as diskette, hard drive, CDROM and so forth), input/output devices 408 (such as keyboard, cursor control and so forth), and communication interfaces 410 (such as network interface cards, modems and so forth). The elements are coupled to each other via system bus 412, which represents one or more buses. In the case of multiple buses, they are bridged by one or more bus bridges (not shown).

Each of these elements performs its conventional functions known in the art. In particular, system memory 404 and mass storage 406 may be employed to store a working copy and a permanent copy of the programming instructions implementing selected ones or all of the various components of embodiments of the present invention, such as the processes illustrated by FIG. 1, herein collectively denoted as 422. The various components may be implemented as assembler instructions supported by processor(s) 402 or high level languages, such as C, that can be compiled into such instructions.

The permanent copy of the programming instructions may be placed into permanent storage 406 in the factory or in the field, through, for example, a distribution medium (not shown) or through communication interface 410 (from a distribution server (not shown)).

The constitution of these elements 402-412 is known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. Those skilled in the art will readily appreciate that the present invention may be implemented in a very wide variety of embodiments or extended therefrom. For example, in various embodiments, the system may also be extended to provide confidence metrics for the predictions. This application is intended to cover any adaptations or variations of the embodiments discussed herein. Therefore, it is manifestly intended that this invention be limited only by the claims and the equivalents thereof.

What is claimed is:

1. A method comprising:
   receiving, by a computing device, a first collection of documents and/or objects determined by a first process to be relevant to a keyword, wherein the first process comprises searching a multiplicity of documents and/or objects;
   processing, by the computing device, the first collection of documents and/or objects to extract one or more keyword characterizations from within at least one of the documents and/or objects of the first collection, wherein the processing comprises generating, by the computing device, a spectrum of n-grams to characterize the one or more keywords, where n is an integer equal to or greater than 1; and
   receiving, by the computing device, a second collection of documents and/or objects determined by a second process to be relevant to the one or more keyword characterizations, wherein the second process comprises using at least one of the one or more keyword characterizations as proxies for the keyword.

2. The method of claim 1, wherein a selected one of the first and the second collection of documents and/or objects is received as search results produced by a search engine from a search, based on the keyword, of a selected one of a database, a corpus of information, or a World Wide Web.

3. The method of claim 1, wherein a selected one of the first and the second collection of documents and/or objects comprises at least one of: web pages determined to be potentially relevant to the keyword, documents from an electronic information corpus, and data objects including at least one of images, video files, audio files, executable applications, and abstractions of physical objects.

4. The method of claim 1, wherein the processing further comprises
   extracting, by the computing device, noun phrases, proper nouns, or named entities from the first collection of documents and/or objects and aggregating the noun phrases, proper nouns, or named entities;
   determining, by the computing device, links to and/or from a web page of the first collection of documents and/or objects;
   calculating, by the computing device, a distance to a set of websites or data resources, wherein the distance is a number of link traversals required to get between a search results page of the first collection of documents and/or objects and one of the set of websites or data resources;
   determining, by the computing device, a distance metric from a word of the keyword to representations of a range of core word senses; and
   determining, by the computing device, a web page of the first collection of documents and/or objects.

5. The method of claim 1, wherein the generating the spectrum of n-grams comprises determining, by the computing device, a frequency of occurrence of each of the plurality of n-grams and normalizing the frequency of occurrence of each of the plurality of n-grams relative to a reference corpus.

6. The method of claim 1, further comprising computing, by the computing device, a measure of keyword similarity for the keyword, based at least on the one or more keyword characterizations for use as proxies for the keyword.

7. The method of claim 6, wherein the processing comprises generating, by the computing device, a spectrum of n-grams, and the measure of keyword similarity is computed by taking a dot product of the spectrum of n-grams and weighing each n-gram based on an inverse frequency of that n-gram.

8. The method of claim 6, wherein the measure of keyword similarity is computed using a Bayesian classifier, wherein the keyword or one of the one or more keyword characterizations is treated as a document, and another keyword or one of the one or more keyword characterizations is treated as a category.

9. The method of claim 1, further comprising facilitating, by the computing device, keyword behavior modeling of the keyword, based at least on the one or more keyword characterizations for use as proxies for the keyword.

10. The method of claim 9, wherein the one or more keyword characterizations are input into models of keyword click-through and revenue-generating properties of search advertisements.

11. The method of claim 9, wherein the keyword behavior modeling includes at least one of a neural network and a backward propagation system.

12. The method of claim 1, further comprising filtering, by the computing device, a plurality of keywords, based at least on the one or more keyword characterizations.

13. The method of claim 1, further comprising finding, by the computing device, one or more advertisements, by a search engine, based at least on the one or more keyword characterizations for use as proxies for the keyword.

14. The method of claim 13, further comprising finding, by the computing device, a topic most relevant to the one or more keyword characterizations, and finding the one or more advertisements based at least in part on the topic.

15. The method of claim 13, wherein the one or more advertisements are relevant to a domain name.

16. The method of claim 1, further comprising
   processing, by the computing device, the second collection of documents and/or objects to extract an additional one or more keyword characterizations to be merged with the one or more keyword characterizations for use as proxies for the keyword.

17. An apparatus comprising:
a processor; and
a generator, operated by the processor and adapted to
   receive a first collection of documents and/or objects determined by a first process to be relevant to a keyword, wherein the first process comprises searching a multiplicity of documents and/or objects,
   process the collection of documents and/or objects to extract one or more keyword characterizations from within at least one of the documents and/or objects of the first collection, and
   receive a second collection of documents and/or objects determined by a second process to be relevant to the one or more keyword characterizations, wherein the second process comprises using the one or more keyword characterizations as proxies for the keyword;
   wherein said process the collection of documents and/or objects comprises generation of a spectrum of n-grams to characterize the one or more keywords, where n is an integer equal to or greater than 1.

18. The apparatus of claim 17, wherein a selected one of the first and the second collection of documents and/or objects is received as search results produced by a search engine from a search, based on the keyword, of a selected one of a database, a corpus of information, or a World Wide Web.

19. The apparatus of claim 17, wherein a selected one of the first and the second collection of documents and/or objects comprises at least one of: web pages determined to be potentially relevant to the keyword, documents from an electronic information corpus, and data objects including at least one of images, video files, audio files, executable applications, and abstractions of physical objects.

20. The apparatus of claim 17, wherein the generator is adapted to process a selected one of the first and the second collection of documents and/or objects, and the processing further comprises:
   extracting noun phrases, proper nouns, or named entities from the selected one collection of documents and/or objects and aggregating the noun phrases, proper nouns, or named entities;
   determining links to and/or from a web page of the selected one collection of documents and/or objects;
   calculating a distance to a set of websites or data resources, wherein the distance is a number of link traversals required to get between a search results page of the selected one collection of documents and/or objects and one of the set of websites or data resources;

determining a distance metric from a word of the keyword to representations of a range of core word senses; and determining a web page of the selected one collection of documents and/or objects.

21. The apparatus of claim 17, wherein the apparatus further comprises a computing engine adapted to compute a measure of keyword similarity for the keyword, based at least on the one or more keyword characterizations to be used as proxies for the keyword.

22. The apparatus of claim 17, wherein the apparatus further comprises a modeler adapted to facilitate keyword behavior modeling of the keyword, based at least on the one or more keyword characterizations to be used as proxies for the keyword.

23. The apparatus of claim 17, wherein the apparatus further comprises a filter adapted to filter a plurality of keywords, based at least on the one or more keyword characterizations.

24. The apparatus of claim 17, wherein the apparatus further comprises a search engine adapted to find one or more advertisements, based at least on the one or more keyword characterizations to be used as proxies for the keyword.

25. The apparatus of claim 17, wherein the generator is included in a keyword search engine of the apparatus.

26. An article of manufacture comprising:
    a storage medium; and
    a plurality of programming instructions designed to program an apparatus and enable the apparatus to
        receive a collection of documents and/or objects determined by a first process to be relevant to a keyword, wherein the first process comprises searching a multiplicity of documents and/or objects; and
        process the collection of documents and/or objects to extract one or more keyword characterizations from within at least one of the documents and/or objects of the first collection, the one or more keyword characterizations to be used as proxies for the keyword in a second process, wherein the second process comprises searching a multiplicity of documents and/or objects;
        wherein process comprises generation of a spectrum of n-grams to characterize the one or more keywords, where n is an integer equal to or greater than 1.

27. The article of claim 26, wherein the collection of documents and/or objects comprise at least one of: web pages determined to be potentially relevant to the keyword, documents from an electronic information corpus, and data objects including at least one of images, video files, audio files, executable applications, and abstractions of physical objects.

28. The article of claim 26, wherein the programming instructions are further designed to enable the apparatus to process the collection of documents and/or objects, and the processing further comprises:
    extracting noun phrases, proper nouns, or named entities from the collection of documents and/or objects and aggregating the noun phrases, proper nouns, or named entities;
    determining links to and/or from a web page of the collection of documents and/or objects;
    calculating a distance to a set of websites or data resources, wherein the distance is a number of link traversals required to get between a search results page of the collection of documents and/or objects and one of the set of websites or data resources;
    determining a distance metric from a word of the keyword to representations of a range of core word senses; and
    determining a web page of the collection of documents and/or objects.

29. The article of claim 26, wherein the programming instructions are further designed to enable the apparatus to compute a measure of keyword similarity for the keyword, based at least on the one or more keyword characterizations to be used as proxies for the keyword.

30. The article of claim 26, wherein the programming instructions are further designed to enable the apparatus to facilitate keyword behavior modeling of the keyword, based at least on the one or more keyword characterizations to be used as proxies for the keyword.

31. The article of claim 26, wherein the programming instructions are further designed to enable the apparatus to find one or more advertisements, based at least on the one or more keyword characterizations to be used as proxies for the keyword.

* * * * *